United States Patent [19]
Bailey

[11] Patent Number: 5,919,540
[45] Date of Patent: Jul. 6, 1999

[54] MOTOR VEHICLE FLOOR MAT WITH EXCHANGEABLE TEXTILE FACED INSERT

[76] Inventor: Bob Bailey, 2022 Maple Ave., Charlton, N.Y. 12019

[21] Appl. No.: 08/963,655

[22] Filed: Nov. 3, 1997

Related U.S. Application Data

[60] Provisional application No. 60/030,198, Nov. 4, 1996.

[51] Int. Cl.$^6$ ....................................................... B32B 3/06
[52] U.S. Cl. ................................. 428/67; 428/89; 428/95; 428/99; 15/217
[58] Field of Search .................................. 428/67, 95, 89, 428/99; 15/217; 52/181

[56] References Cited

U.S. PATENT DOCUMENTS

| | | | |
|---|---|---|---|
| 3,424,265 | 1/1969 | Stata | 180/90.6 |
| 3,605,166 | 9/1971 | Chen | 296/1 |
| 3,930,084 | 12/1975 | Shields | 428/67 |
| 4,671,981 | 6/1987 | McLaughlin | 428/95 |
| 4,829,627 | 5/1989 | Altus et al. | 428/95 |
| 4,876,135 | 10/1989 | McIntosh | 428/74 |
| 5,215,348 | 6/1993 | Wen-Hwang | 15/215 |
| 5,316,817 | 5/1994 | Timperley | 428/78 |
| 5,482,759 | 1/1996 | Primeau | 428/167 |

FOREIGN PATENT DOCUMENTS

| | | | |
|---|---|---|---|
| 1 198 466 | 12/1985 | Canada | B60N 3/04 |
| 0 379 630 | 4/1989 | European Pat. Off. | B60N 3/04 |
| 2 328 431 | 5/1977 | France . | |
| 2 617 102 | 6/1987 | France | B60N 3/04 |
| 2 256 610 | 10/1974 | Germany . | |
| 82 24 039 | 3/1983 | Germany . | |
| 84 37 399 | 8/1985 | Germany | B60N 3/04 |
| 297 01 137 | 3/1997 | Germany . | |
| 58 202119 | 11/1983 | Japan . | |
| 2 127 290 | 10/1985 | United Kingdom . | |
| 2 171 901 | 9/1986 | United Kingdom | A47G 27/02 |

Primary Examiner—Alexander Thomas
Attorney, Agent, or Firm—Heslin & Rothenberg, P.C.

[57] ABSTRACT

A motor vehicle accessory floor mat having an open top basin-like casing for receiving and retaining a removable water and dirt pervious grill therein, is provided with an additional exchangeable textile faced insert. The insert has the same engagement pattern on its underside as the grill so that it readily mates with holding means in the casing. The textile material may cover substantially all of the top surface of the insert or may be provided with a border to accommodate registration and locking engagement of the insert within the casing.

11 Claims, 5 Drawing Sheets

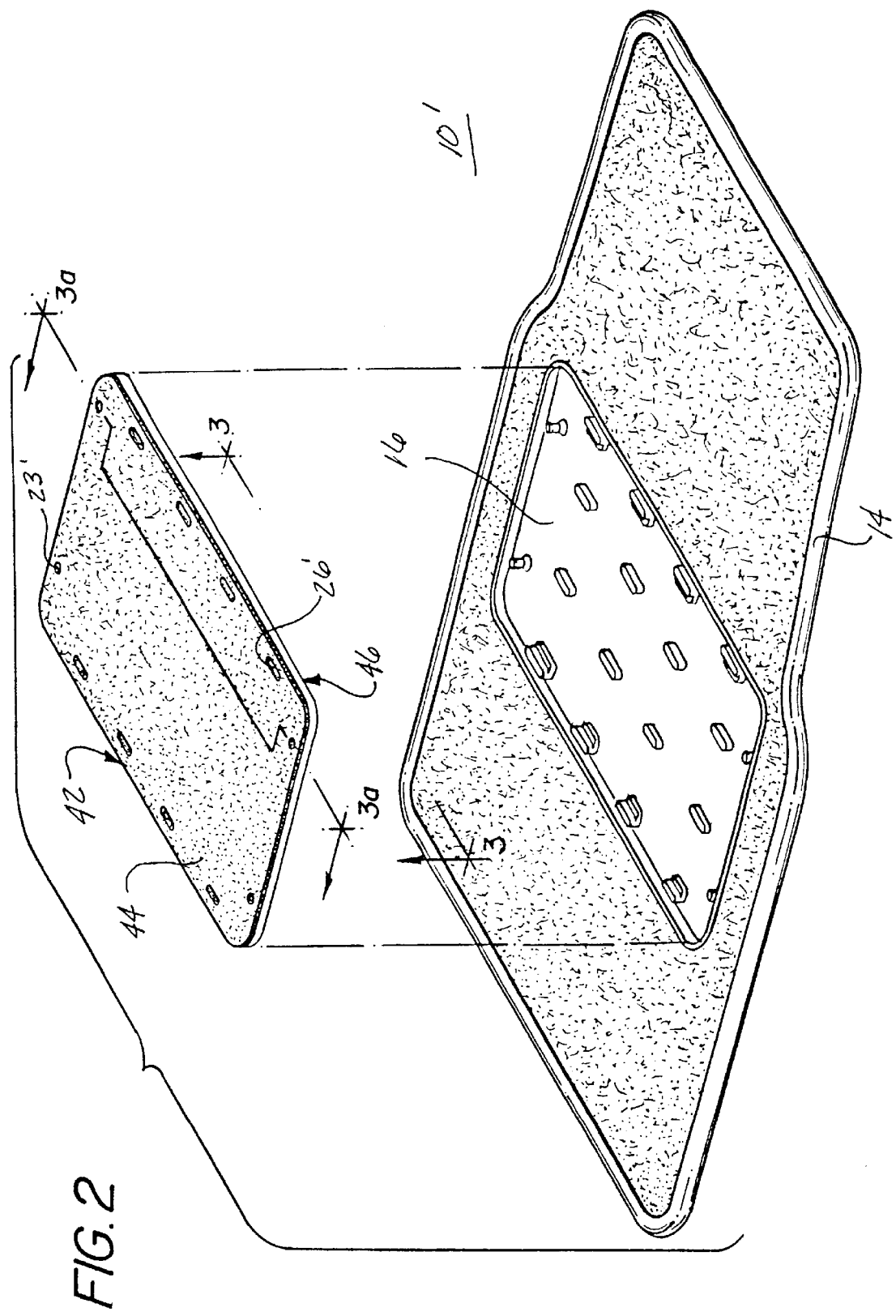

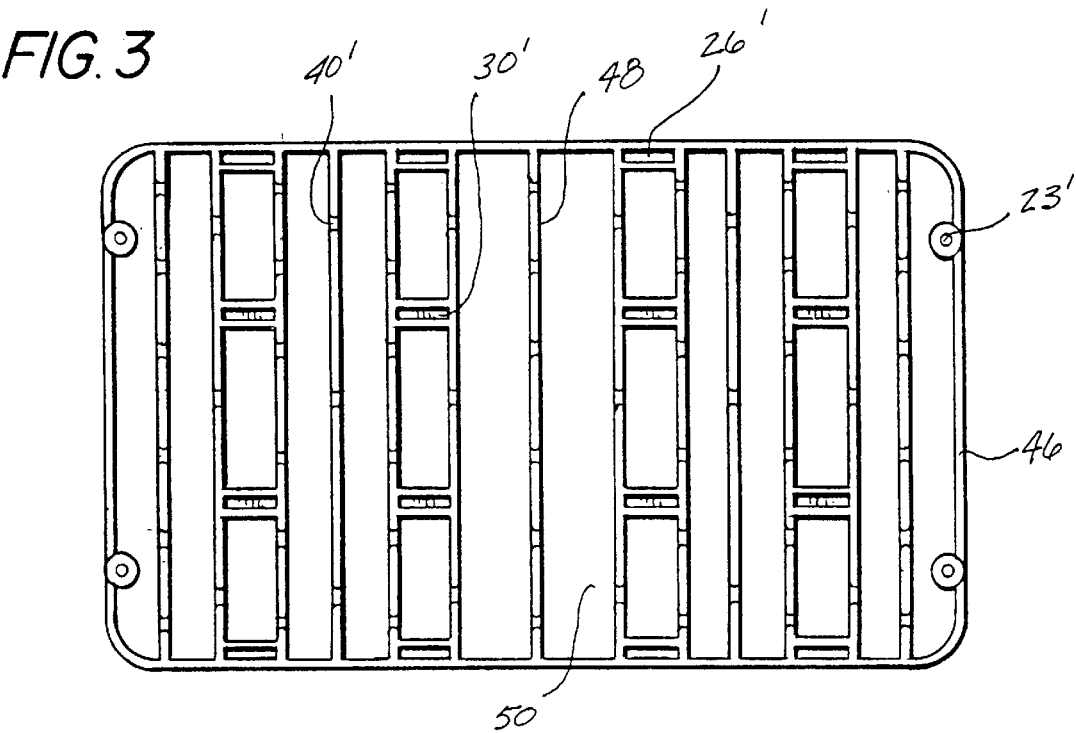
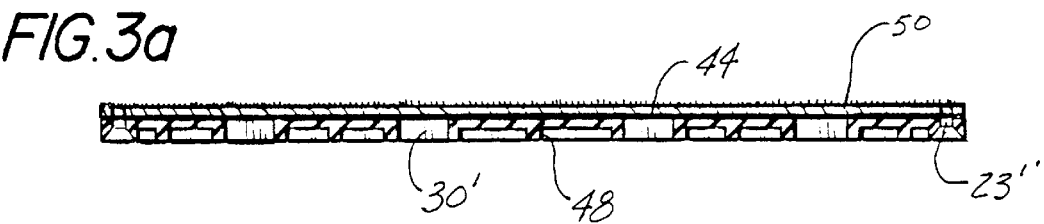
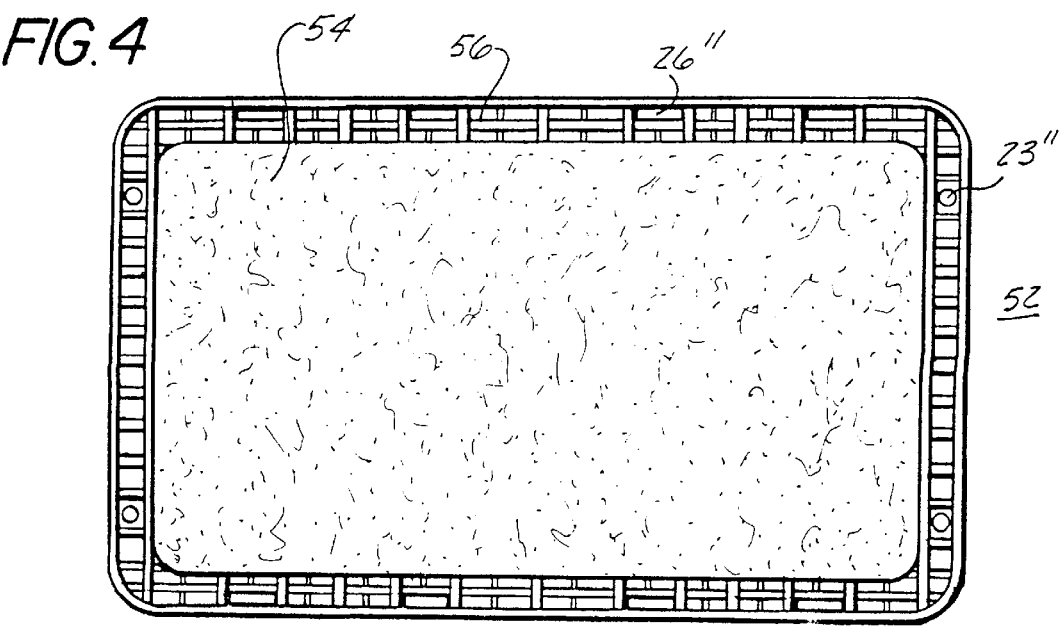

MOTOR VEHICLE FLOOR MAT WITH EXCHANGEABLE TEXTILE FACED INSERT

This application claims the benefit of provisional application 60/030198, filed Nov. 4, 1996.

FIELD OF THE INVENTION

This invention relates generally to accessory floor mats for motor vehicles. More particularly, this invention relates to such an accessory floor mat having an open top basin-like casing for receiving and engaging a dirt and water pervious grill. The grill isolates and therefore protects footwear and the lower edges of clothing of the vehicle's occupant from dirt and moisture which collects in the underlying casing.

BACKGROUND ART

Accessory floor mats for overlying and protecting sections of the floor or original floor covering/carpeting are commonly used in automobiles, sports utility vehicles, trucks and other motor vehicles. In the past, such floor mats have often been made of an elastomeric material and those intended for driver's use have frequently been provided with numerous individual indentations in the top surface for catching dirt and moisture from off of the user's footwear.

A disadvantage of such mats is that in the event of protracted inclement weather such as snow, the individual recesses in the region of the heels of the driver's shoes can quickly become filled beyond capacity and overflow and wet the floor of the vehicle. Further, there is a risk that the heels of the shoes and also lower portions of the driver's clothing may come into contact with and be soiled or damaged by the retained water and dirt.

To overcome the above-described shortcomings, accessory floor mats have been designed with open top basin-like casings for receiving and securely engaging a removable grating or grill. The grill typically has apertures dimensioned to be so small that only dirt and water can pass therethrough. Further, in this construction, the entire volume of the casing rather than numerous independent recesses is available to be occupied by the water and dirt. This arrangement isolates and therefore protects the shoes and clothing of an occupant of the vehicle from contamination by the water and dirt collected in the bottom of the casing. The significant water holding capacity of the basin-like casing diminishes the chances of overflow and reduces the frequency at which the mat must be emptied. Moreover, accumulated material can easily be emptied out by removing the floor mat from the floor well, lifting off the grill, and then emptying the casing by tilting or turning over the floor mat. Accessory floor mats of this construction are described in United Kingdom patent GB 2127290B, European patent 0379630 and French patent 2617102.

Although such mats have proven effective in fulfilling their intended purpose, there emphasis on functionality rather than appearance has, so far, effectively limited the acceptance of these mats to the after market. In the original equipment market (i.e. accessory floor mats that are sold in conjunction with new vehicles) where there is a greater emphasis on aesthetic appeal, such accessory floor mats have not won wide acceptance. In addition, during those times of the year when the weather is less inclement and the need for protecting the user's footwear from excess moisture and contaminants is less prevalent, the existing accessory floor mats provide little flexibility, short of replacing the entire mat or set of mats in the vehicle.

U.S. Pat. No. 5,482,759 discloses an automobile floor mat which is adaptable to different conditions of various seasons. This floor mat has a removable and reversible pan portion that snugly fits inside a central recessed area to collect contaminants. A first side of the pan portion has a plurality of spaced apart ridges forming individual grooves that are used to collect fluids or contaminants that adhere to the driver's feet such as salt, sand or snow, mostly during the winter. The other side of the reversible pan portion may also contain grooves, but preferably is made of an abrasive surface to scrape-off any contaminant adhering to the sole of the shoes. Such an abrasive surface may be sand paper or the like, to collect small contaminants that are adhering during the summer, such as dirt, sand or leaves. This construction, while allowing seasonal variation, does not address the aesthetic appearance need of the original equipment market and, because of its use of independent grooves would appear not to be as effective in isolating footwear and clothing from water and contaminants in the winter season as those which employ a grill.

A need thus persists for a motor vehicle accessory floor mat which preserves the functional advantages of existing mats that employ removable dirt and moisture pervious grills during periods of protracted inclement weather, while enhancing the aesthetic appeal of such mats during other seasons of the year.

SUMMARY OF THE INVENTION

This need is met, the shortcomings of the prior art overcome and other advantages realized, in accordance with the principles of the present invention, by the provision of an exchangeable textile faced insert for a motor vehicle accessory floor mat. The top surface of the insert is substantially covered with a textile material affording it an attractive aesthetically appealing appearance and a more comfortable foot supporting surface. The insert is configured so that it fits within the same floor mat recess or casing as a removable grill. The grill is installed in the mat during periods of protracted inclement weather and can then simply be removed and replaced by the textile faced insert during other times of the year. Preferably, the underside of the insert is provided with the same engagement pattern as the back of the grill to facilitate easy substitution and secure engagement within the basin-like casing of the mat.

In one embodiment, the textile material covers substantially the entire top surface of the insert. The underside of the insert can be provided with a pattern to ensure registration and secure engagement within a recess of the accessory floor mat. In an alternative embodiment, substantially all of a central portion of the top surface of the insert is covered with a textile material while a border provides for appropriate registration and secure engagement in the recess of the mat. The textile faced insert may be manufactured by compression molding, injection molding, extrusion or other known processes. The insert may be formed as a single integral unit or from separate textile and engagement patterned portions which are then laminated or otherwise securely affixed together. The textile component of the insert preferably comprises a carpet or heel pad material.

BRIEF DESCRIPTION OF THE DRAWINGS

These and other features, objects and advantages of the present invention will be more readily understood from the following detailed description of preferred embodiments, when read in conjunction with the accompanying drawings in which like reference numbers are used to designate like parts in the different views.

FIG. 2 is an exploded view illustrating a motor vehicle accessory floor mat having a textile faced insert, in accordance with the principles of the present invention.

FIG. 3 is a plan view of the underside of the textile faced insert of FIG. 2.

FIG. 3a is a cross-sectional view taken along line 3a–3a of FIG. 2.

FIG. 4 is a top plan view of an alternative embodiment of the insert of the present invention.

DETAILED DESCRIPTION

Figure 1:
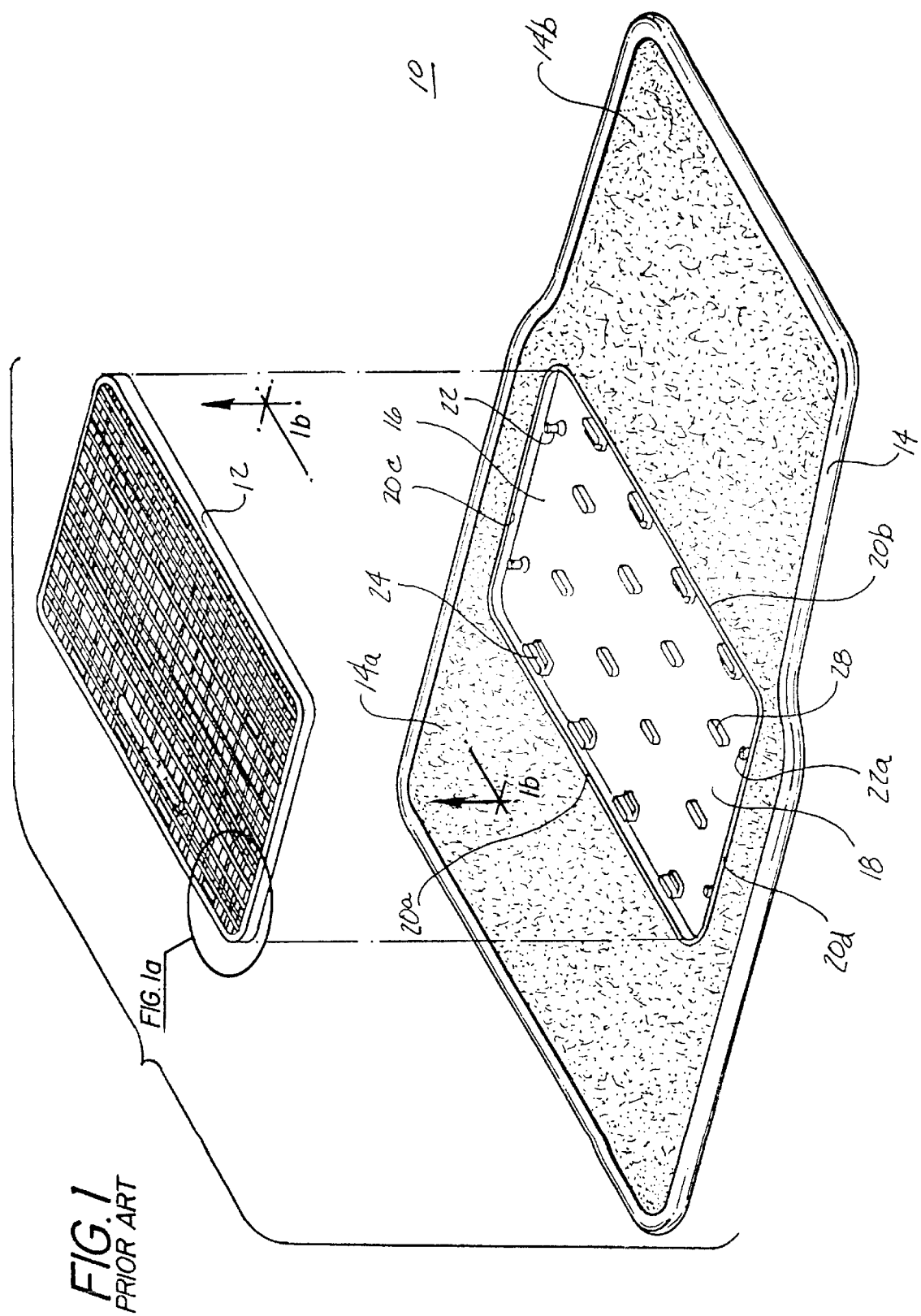
FIG. 1 is an exploded view of a known motor vehicle accessory floor mat having a removable grill.
Figure 1A:
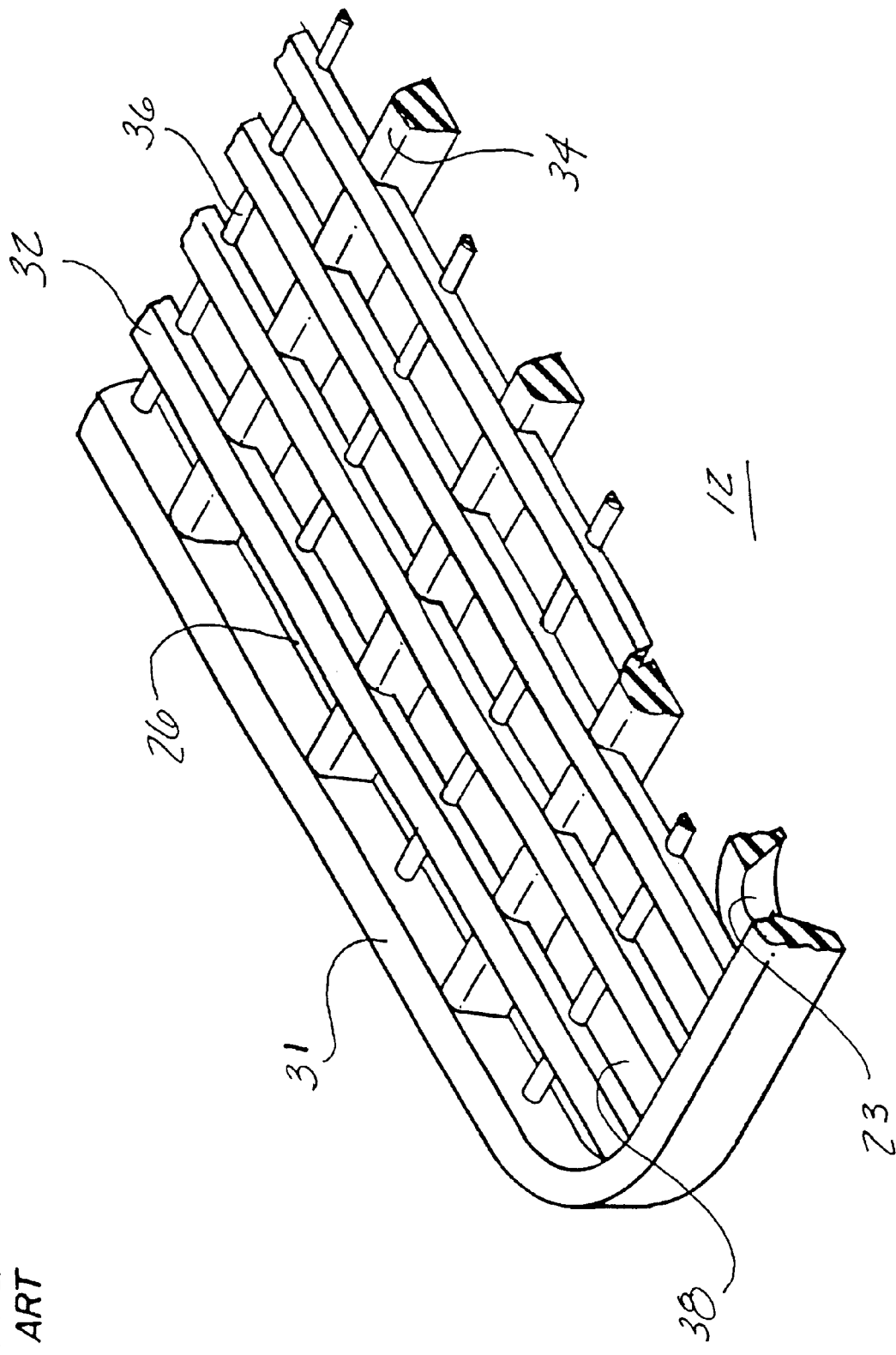
FIG. 1a is a blown-up partial cut-away view of the grill of FIG. 1.
Figure 1B:
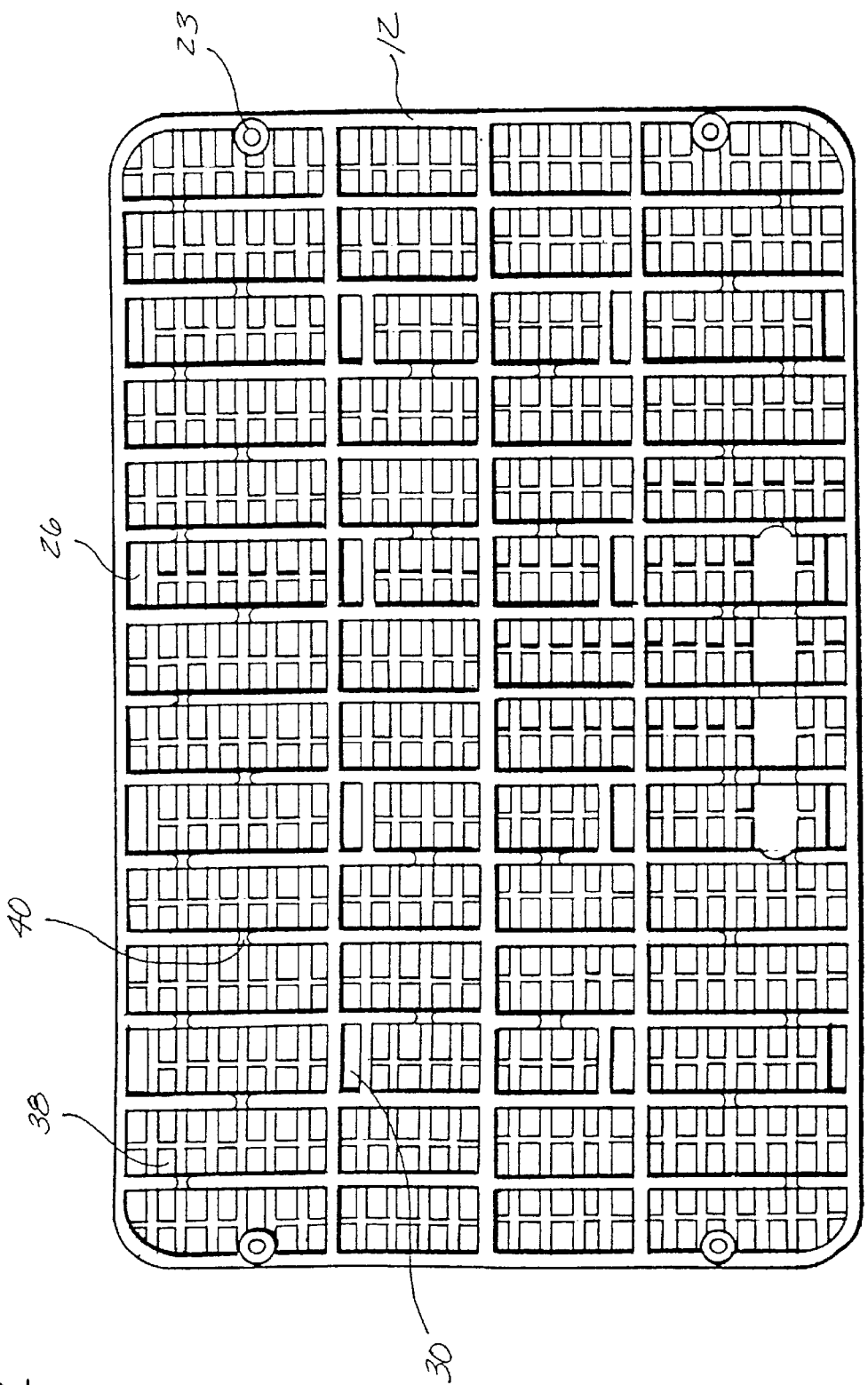
FIG. 1b is a plan view of the underside of the grill of FIG. 1.

A known motor vehicle accessory floor mat 10 having a removable grill or grating 12 is generally depicted in FIGS. 1, 1a and 1b. Such a mat is sold under the trademark AUTOGULLY and is available from RAIDA GmbH of Germany. This mat is generally used on the driver's side of a motor vehicle and is especially designed to prevent dirt and moisture from damaging and soiling shoes and the lower edges of the driver's clothing.

Mat 10 includes a body portion 14 which can be formed of elastomeric material, such as rubber or plastic, or a carpet or other textile material. Body portion 14 is configured to fit within a floor well of the vehicle on top of the original floor covering. A rear portion 14a is generally disposed on the horizontal floor of the floor well while a forward portion 14b rests on an inclined front firewall of the vehicle.

An open top basin-like casing 16 is sewn or otherwise secured within a cut-out section of portion 14a of the mat. Casing 16 includes a recessed base 18 surrounded by a rear wall 20a, a front wall 20b and two side walls 20c and 20d. These walls may be provided with an outwardly extending lip to facilitate attachment of the casing to the surrounding body portion 14 of the mat. Casing 16, can be made of polyvinylchloride (PVC) or other suitable material, by injection molding or other known techniques, and includes holding means for securely engaging and retaining grill 12 within the recess formed by casing 16. In the particular example shown, the holding means includes a pair of locking posts 22 extending upwardly from base 18 near each side wall 20c and 20d. Each post 22 has a flared top 22a which protrudes through an aligned receptacle 23 formed in grill 12 and serves to help hold grill 12 in place. The base 18 of casing 16 also supports a series of raised registration supports 24 located near rear side wall 20a and front side wall 20b. Supports 24 are designed to extend into and frictionally engage matching peripheral through slots 26 in grill 12. Casing 16 also includes a series of base supported lower height registration supports 28. Supports 28 engage corresponding pockets 30 formed on the back of grill 12 and help prevent shifting of the grill.

Grill 12 is designed to snugly fit and be held within the recess formed by casing 16. Grill 12 includes an outer frame 31 which supports intersecting cross pieces 32, 34, and 36 defining a grid pattern of small, dirt and water pervious through openings 38. As best seen in the blown up cut-away sectional view of FIG. 1a and the bottom plan view of FIG. 1b, grill 12 also includes hollow cylindrically shaped receptacles 23 for receiving corresponding locking posts 22, and elongated peripheral through slots 26 for engaging raised registration supports 24.

As best seen in FIG. 1b, the underside of grill 12 has a pattern of such post receiving receptacles 23, raised registration support receiving slots 26 and lower height registration support receiving pockets 30 for engaging the holding means of casing 16. The layout and construction of the holding means in casing 16 may vary from that shown, provided that the engagement pattern on the underside of grill 12 is correlated thereto. Grill 12 is preferably made of rigid or semi-rigid plastic material, for example, PVC, and can be formed by injection molding or other known techniques.

On the underside of grill 12, channels 40 are selectively provided through cross pieces 34 to allow water and contaminants to flow throughout the recess formed by casing 16. When grill 12 is installed in casing 16, dirt and moisture stripped from the shoes penetrates through the openings 38 in the grill and is deposited in the recess formed by the casing. The casing has a significant collecting capacity, e.g. 500 ml. The grill thus isolates the driver's shoes and clothing from the water and dirt avoiding soiling or other damage thereto.

In accordance with the principles of the present invention, an accessory floor mat of the type illustrated in FIG. 1 is provided with an additional, interchangeable textile faced insert which affords a more aesthetically appealing and fashionable appearance to the mat and more comfortable foot support when weather conditions do not require use of the grill. The textile faced insert thus provides the user with the option of selectively dressing-up the appearance of the mat without the expense and trouble of replacing the entire mat. When the weather again turns inclement, the insert can be readily removed and replaced with the water and dirt pervious grill.

FIGS. 2, 3 and 3a depict a motor vehicle accessory floor mat 10' having a body portion 14, casing 16 and associated holding means identical to that previously described in conjunction with FIG. 1. In place of grill 12, mat 10' includes a removable textile faced insert 42. Insert 42 is sized and configured to snugly fit within the recess formed by casing 16. Substantially all of the top surface of insert 42 is covered with a textile material 44, such as tufted carpet or a low profile denser woven heel pad material. The textile material may have a logo or other pattern (not shown) woven, embroidered or otherwise impressed therein. Color, density, thickness, texture and other characteristics of textile material 44 can be selected to provide the desired aesthetic effect. Textile material 44 also provides more comfortable foot support.

As best seen in FIG. 3, the underside of insert 42 is provided with an engagement pattern identical to that of grill 12 to ensure engagement and retention by the holding means in casing 16. The underside portion 46 of insert 42 can be made of a thermoformable material, e.g. thermoplastic olefin and formed by compression molding, injection molding, extrusion or other known processes. Underside portion 46 is provided with through receptacles 23', through slots 26', and pockets 30' at locations identical to those of the corresponding elements on the back of grill 12 in order to ensure that insert 42 is fully engaged and retained by the holding means in casing 16 of the mat. Underside portion 46 preferably also has supporting ribs 48 extending rearwardly from a planar support surface 50. Textile material 44 is secured on top of support surface 50. The apertures of receptacles 23' and slots 26' extend through support surface 50 and textile material 44 as shown in FIG. 2.

An alternative embodiment of the textile faced insert of the present invention is shown in top plan view in FIG. 4. This insert 52 has a textile material 54 covering substantially all of the central portion of its top surface. A border 56 surrounds and frames textile material 54 and includes through receptacles 23" and through slots 26" to receive and engage the holding means in casing 16. Pockets 30" (not shown) can be formed on the backside of insert 52 to mate with the corresponding centrally located lower height registration supports. Border 56 may comprise the perimeter portion of grill 12 thereby affording identical registry and locking securement to the insert. Textile material 54 may comprise a carpet or heelpad material. Border 56 and a supporting structure underlying textile material 54 may be made of PVC or other suitable material, by injection molding or other known techniques. Textile material 54 can be integral with the supporting structure or laminated or otherwise suitably affixed thereto.

The carpet faced insert of the present invention adds flexibility and choice to the existing accessory floor mat. The benefits of the existing removable grill in protecting footwear and clothing during inclement weather are retained, while the user is given the option, through quick and easy exchange, of dressing up the mat with a more aesthetically appealing and comfortably supportive carpet faced insert during other times of the year.

Although specific embodiments of the invention have been described and depicted herein, those skilled in the art will appreciate that various modifications, additions and substitutions can be made without departing from the spirit of the invention.

What is claimed is:

1. A motor vehicle accessory floor mat comprising:
   a body portion configured to sit in a foot space of a motor vehicle, the body portion having an open top basin-like casing defining a recess in said mat;
   holding means associated with said casing;
   a removable dirt and water pervious grill having a first engagement pattern for engagement by said holding means to retain the grill within said recess; and
   a textile faced insert interchangeable with said grill.

2. The motor vehicle accessory floor mat of claim 1 wherein said textile faced insert has a second engagement pattern substantially identical to said first engagement pattern whereby the insert can be retained within said recess by said holding means.

3. The motor vehicle accessory floor mat of claim 2 wherein substantially all of a top surface of the insert is covered with textile material.

4. The motor vehicle accessory floor mat of claim 3 wherein said textile material comprises carpet.

5. The motor vehicle accessory floor mat of claim 4 wherein said second engagement pattern is provided on an underside of said insert.

6. The motor vehicle accessory floor mat of claim 5 wherein the second engagement pattern includes receptacles for receiving said holding means.

7. The motor vehicle accessory floor mat of claim 6 wherein at least one of said receptacles extend through said carpet.

8. The motor vehicle accessory floor mat of claim 3 wherein said textile material comprises one of (a) tufted carpet and (b) woven heel pad material.

9. The motor vehicle accessory floor mat of claim 3 wherein said textile material has a pattern impressed therein.

10. The motor vehicle accessory floor mat of claim 2 wherein substantially all of a central portion of a top surface of the insert is covered with textile material, a border region surrounds said textile material, and said border region includes at least a portion of said second engagement pattern.

11. The motor vehicle accessory floor mat of claim 10 wherein said border region comprises a grid pattern substantially identical to a perimeter portion of the removable grill.

* * * * *